United States Patent
Hachey

(10) Patent No.: US 11,893,135 B2
(45) Date of Patent: Feb. 6, 2024

(54) METHOD AND SYSTEM FOR AUTOMATED TEXT

(71) Applicant: Harrison-AI Pty Ltd, Sydney (AU)

(72) Inventor: Benjamin Clayton Hachey, Sydney (AU)

(73) Assignee: Harrison AI Pty Ltd, Sydney (AU)

( * ) Notice: Subject to any disclaimer, the term of this patent is extended or adjusted under 35 U.S.C. 154(b) by 394 days.

(21) Appl. No.: 17/180,233

(22) Filed: Feb. 19, 2021

(65) Prior Publication Data
US 2021/0256160 A1 Aug. 19, 2021

(30) Foreign Application Priority Data

Feb. 19, 2020 (AU) ................................ 2020900473

(51) Int. Cl.
| | |
|---|---|
| G06F 21/62 | (2013.01) |
| G06F 40/295 | (2020.01) |
| G06N 20/00 | (2019.01) |
| G06F 40/166 | (2020.01) |
| G06F 40/205 | (2020.01) |
| G06F 40/284 | (2020.01) |

(52) U.S. Cl.
CPC ........ *G06F 21/6254* (2013.01); *G06F 40/166* (2020.01); *G06F 40/295* (2020.01); *G06N 20/00* (2019.01); *G06F 40/205* (2020.01); *G06F 40/284* (2020.01)

(58) Field of Classification Search
CPC ...... G06F 21/62; G06F 40/295; G06F 40/166; G06F 21/6254; G06F 40/284; G06N 20/00
See application file for complete search history.

(56) References Cited

U.S. PATENT DOCUMENTS

| | | | |
|---|---|---|---|
| 7,724,918 B2 | 5/2010 | Balakrishnan et al. | |
| 8,930,178 B2 | 1/2015 | Li et al. | |
| 10,043,516 B2 | 8/2018 | Saddler et al. | |
| 10,366,168 B2 | 7/2019 | Wu | |
| 10,616,199 B2 | 4/2020 | Du | |
| 2011/0239113 A1 | 9/2011 | Hung et al. | |
| 2018/0052904 A1* | 2/2018 | Fusco | G06F 17/30 |
| 2018/0053114 A1 | 2/2018 | Adjaoute | |

(Continued)

FOREIGN PATENT DOCUMENTS

GB 2485783 A 5/2012

OTHER PUBLICATIONS

Amazon Comprehend Medical, webpage, at https://aws.amazon.com/comprehend/medical, pp. 1-6 (2021).

(Continued)

*Primary Examiner* — Richemond Dorvil
*Assistant Examiner* — Ethan Daniel Kim
(74) *Attorney, Agent, or Firm* — Muncy, Geissler, Olds & Lowe, P.C.

(57) ABSTRACT

A system for automated text anonymisation of clinical text, the system including an AI pipeline module to configure symbolic AI pipeline components for detecting protected health information (PHI) in the clinical text; a masking module for masking the detected PHI in the clinical text and generating a de-identified clinical text output file as well as a corresponding label file with de-identified information. The pipeline components may include at least one non-symbolic AI pipeline component or machine learning model.

18 Claims, 8 Drawing Sheets

(56) References Cited

U.S. PATENT DOCUMENTS

| | | |
|---|---|---|
| 2018/0165604 A1 | 6/2018 | Minkin et al. |
| 2019/0238516 A1 | 8/2019 | Wiggenmann et al. |
| 2019/0354544 A1* | 11/2019 | Hertz ................... G06F 16/33 |
| 2020/0250139 A1* | 8/2020 | Muffat .................. G06F 16/14 |
| 2020/0334416 A1* | 10/2020 | Vianu .................. G06F 40/295 |

OTHER PUBLICATIONS

Kaul, "Health Scan Analysis using AWS Coprehend Medical," presentation, pp. 1-18.

Guzman et al., "Assessment of Amazon Comprehend Medical: Medication Information Extraction," at https://www.researchgate/339015552_Assessment_of_Comprehend_Medical_Medication_Information_Extraction; pp. 1-14 (2021).

Fisher et al., "How natual language processing can uncover value from unreachable data in the modern medical ecosystem," webpage in AWS for Industries, pp. 1-14 (2020).

Austrailian Office Action dated Apr. 27, 2021 in corresponding application 2021201071.

Yang, et al., "Automatic detection of protected health information from clinic narratives," J. of Biomed Informatics, Suppl 58, pp. S30-S38 (Jun. 15, 2015).

Lee, et al., "A hybrid approach to automatic de-identification of psychiatic notes," J. of Biomed Informatics, Suppl 75, pp. S19-S27 (Jun. 6, 2017).

Liu et al., "De-identification of critical notes via recurrent neural network and conditional random field," J. of Biomed Informations, Suppl 75, pp. S34-S42 (May 23, 2017).

Neamatullah, et al., Automated de-identification of free-text medical records, BMC Med Inform Decis Mak 8, pp. 1-17 (2008).

* cited by examiner

500

FINAL REPORT

INDICATION: Cough, fever, and right basilar rhonchi. Evaluate for pneumonia.

TECHNIQUE: PA and lateral views of the chest.

COMPARISON: Chest radiograph from 26th Oct 2012. CTA of the chest from 17th Jul 2011.

FINDINGS:

The lungs are clear without consolidation or edema. There is mild prominence of the right pulmonary veins, which is unlikely of clinical significance. There is no pleural effusion or pneumothorax. The cardiomediastinal silhouette is normal in size. Mitral annular calcifications are noted. An S-shaped thoracolumbar scoliosis is unchanged.

IMPRESSION:

No acute cardiopulmonary process; specifically, no evidence of pneumonia.

NOTIFICATION: The findings were discussed by Dr. Sally Hooper with Dr. Colin Williams on the telephone on 16th Jul 2019 at 3:37 PM, 5 minutes after discovery of the findings.

501

{"label": "DATE", "start": 213, "end": 226, "text": "10/30/2012"}
{"label": "DATE", "start": 250, "end": 263, "text": "07/27/2011"}
{"label": "NAME", "start": 775, "end": 787, "text": "chTrWsLz"}
{"label": "NAME", "start": 797, "end": 811, "text": "tfidSDifBr"}
{"label": "DATE", "start": 833, "end": 846, "text": "07/20/2019"}

502

FINAL REPORT

INDICATION: Cough, fever, and right basilar rhonchi. Evaluate for pneumonia.

TECHNIQUE: PA and lateral views of the chest.

COMPARISON: Chest radiograph from ▮▮▮▮. CTA of the chest from ▮▮▮▮.

FINDINGS:

The lungs are clear without consolidation or edema. There is mild prominence of the right pulmonary veins, which is unlikely of clinical significance. There is no pleural effusion or pneumothorax. The cardiomediastinal silhouette is normal in size. Mitral annular calcifications are noted. An S-shaped thoracolumbar scoliosis is unchanged.

IMPRESSION:

No acute cardiopulmonary process; specifically, no evidence of pneumonia.

NOTIFICATION: The findings were discussed by Dr. ▮▮▮▮ with Dr. ▮▮▮▮ on the telephone on ▮▮▮▮ at 3:37 PM, 5 minutes after discovery of the findings.

FINAL REPORT
EXAMINATION: CHEST (PORTABLE AP)

INDICATION: 109 year old man with CHF // Interval change

TECHNIQUE: Portable chest radiograph

COMPARISON: Chest radiograph 4th June 2013

FINDINGS:

Tip of the right central venous catheter terminates in the upper right atrium.

There is dense left retrocardiac opacity that may represent atelectasis, although infection could be considered in the appropriate clinical setting. Mild interstitial pulmonary edema has slightly progressed from 1st July 2011. Small left pleural effusion has slightly increased. No sizable pleural effusion on the right. No pneumothorax. Heart size is stable. No acute osseous abnormalities.

IMPRESSION:

1. Slightly worsening interstitial pulmonary edema since 4th May 2014.
2. Increased small left pleural effusion.

601

{"label": "AGE", "start": 97, "end": 100}
{"label": "DATE", "start": 217, "end": 230}
{"label": "DATE", "start": 545, "end": 558}
{"label": "DATE", "start": 810, "end": 822}

602

FINAL REPORT
EXAMINATION: CHEST (PORTABLE AP)

INDICATION: ▆▆ year old man with CHF // Interval change

TECHNIQUE: Portable chest radiograph

COMPARISON: Chest radiograph ▆▆

FINDINGS:

Tip of the right central venous catheter terminates in the upper right atrium.

There is dense left retrocardiac opacity that may represent atelectasis, although infection could be considered in the appropriate clinical setting. Mild interstitial pulmonary edema has slightly progressed from ▆▆. Small left pleural effusion has slightly increased. No sizable pleural effusion on the right. No pneumothorax. Heart size is stable. No acute osseous abnormalities.

IMPRESSION:

1. Slightly worsening interstitial pulmonary edema since ▆▆.
2. Increased small left pleural effusion.

Fig. 6

Pathology Report: ########  + HEADER
ACCESSIONED ON: ############  
CLINICAL DATA: Carcinoma right breast  + CLINICAL
\*\*\* FINAL DIAGNOSIS \*\*\*
LYMPH NODE (SENTINEL),EXCISION
(##########): METASTATIC CARCINOMA IN 1 OF 1
LYMPH NODE.
NOTE: The metastatic deposit spans 0.19CM and is
identified on H&E and cytokeratin immunostains. A
second cytokeratin-positive but cauterized focus likely
also represents metastaic tumor ( <0.1CM ). There is no
evidence of extranodal extension BREAST (RIGHT),
EXCISIONAL BIOPSY (########## : #########)
INVASIVE DUCTAL CARCINOMA (SEE TABLE #1).  + FINDINGS
DUCTAL CARCINOMA IN-SITU,GRADE 1. ATYPICAL
DUCTAL HYPERPLASIA LOBULAR NEOPLASIA
(ATYPICAL LOBULAR HYPERPLASIA)
TABLE OF PATHOLOGICAL FINDINGS #1 INVASIVE
CARCINOMA Tumor size; cannot evaluate. Grade; 1.
Lymphatic vessel invasion ; Not identified
blood vessel invasion: Not identified.
Margin of invasive carcinoma; Invasive carcinoma extends
to less than 0.2cm form the inferior margin of the
specimen. Stains for receptors: Outside
immunohistochemical stains
demonstrate that the tumor cells express estrogen
and progesterone receptors.

Fig. 8

METHOD AND SYSTEM FOR AUTOMATED TEXT

PRIORITY

This nonprovisional application claims priority under 35 U.S.C. § 119(a) to Australian Provisional Patent Application No. 2020900473, which was filed in Australia on Feb. 19, 2020, and which is herein incorporated by reference.

FIELD OF THE INVENTION

The present invention relates generally to a method and system for automated text anonymisation.

BACKGROUND OF THE INVENTION

Identifying information in a text document has been an important aspect in the science of named entity recognition (NER). One use of NER is to detect the presence of and the location of personal information/sensitive information in a text document. Any NER system must overcome the fundamental difficulty that the presence or absence of a word is insufficient to determine relevance. This is due to two intrinsic problems of natural language: synonymy and polysemy. Synonymy refers to the fact that a single underlying concept or idea can be represented by many different terms or combinations of terms. Because of synonymy, it is difficult to realise that two documents describe the same topic when they use different vocabulary, leading to relevant text strings being rejected (false negatives). Because of polysemy, it is difficult to realise that two text strings that use some of the same terms describe different topics, leading to the retrieval of unwanted documents (false positives). A variety of approaches have been developed to address NER tasks in the face of these problems.

Privacy laws and regulations generally prevent protected health information or personal information/sensitive information about an identified individual or an individual who is reasonably identifiable from being collected by a healthcare provider to be provided to external third parties. One use for such information by external third parties is to train a machine learning model or deep learning model that can perform inference on unseen data and generate useful medical predictions.

Therefore, medical researchers increasingly need to anonymise or de-identify protected health information (or other identifying data fields) for use in training a machine learning model. For example, this may include the anonymisation or removal of patient names, medical record numbers, or other identifying characteristics (e.g. date of birth) from the training images and associated text reports. In some examples, protected health information and other identifying information that is included directly within ("burned-in") pixel data may be detected with the use of optical character recognition (OCR) or other computer-assisted techniques.

For example, GB2485783A discloses a method for anonymising personal information contained in a database, the disclosure of which is herein incorporated by reference. However, this method is unsuitable for personal information contained in discrete text files or image files, that are stored in one or more folders. GB2485783A also requires determining a deviation of each data item in the data records of the database relative to reference data items in a reference record, and assigning deviation identifiers to each of the determined deviations in the data records to anonymise the data items in the subset of the data items in the data records.

Additionally, US Patent Publication No. 20190238516 discloses a method and system for automated text anonymisation, the disclosure of which is herein incorporated by reference. The disclosure of US20190238516 requires production of an anonymised vector for a text mining task in lieu of a feature vector. A synthetic vector is constructed which is considered the anonymised vector in lieu of the feature vector. US20190238516 encodes text into a sequence of vectors, e.g., [[0.1, 0.3, 0.9, 0.2], . . . , [0.8, 0.7, 0.1, 0.5]]. This is a technique to obfuscate the whole text entirely. However, this type of obfuscation technique makes it difficult to use the data to train an artificial intelligence (AI) model or use the data for debugging any errors or anomalies detecting during the training of the AI model, and virtually impossible to perform any error analysis because humans are unable to interpret and understand the vectors natively.

For further background on AI see U.S. Patent Publication 2018/0053114, U.S. Pat. Nos. 8,930,178, 10,043,516, 10,366,168, 10,616,199, and U.S. Patent Publication 2018/0165604, the disclosures of all of which are herein incorporated by reference.

It is, accordingly, an object of the present invention to address the foregoing need for automating text anonymisation in an easy to use manner by a clinical domain expert (perhaps a non-software expert) on a variety of reports or text data that are likely to have protected health information present within them. Importantly, accuracy is key so as to reduce false positives and false negatives while also ensuring that unique information that may be needed for training an AI model is retained by the clinical text anonymisation system (e.g. date of injury, type of injury, relative time between events). The invention also provides an improvement in the field of artificial intelligence and natural language processing by accelerating or bootstrapping one or more machine learning models based on symbolic AI logic.

SUMMARY OF THE INVENTION

In one aspect, a system for automated text anonymisation of a clinical text according to the invention provides an AI pipeline module that configures and instantiates an AI pipeline made up of symbolic AI components for detecting protected health information (PHI) in the clinical text; a masking module configured to mask the detected PHI in the clinical text and generate a de-identified clinical text output file, the pipeline components including at least one symbolic AI pipeline component for named entity recognition. The AI pipeline may further comprise a redacter configured to substitute PHI with non-identifying placeholder symbols or characters.

The AI pipeline may further include a newline segmenter configured to split or join sentences in the clinical text according to a predetermined sentence segmentation symbolic AI logic. The symbolic AI pipeline may include a person title named entity recognition (NER) construction module that identifies titles (e.g., Dr., Esq., MD, etc.) in the clinical text by applying symbolic AI rules. The symbolic AI pipeline may include a person label NER construction module that identifies labels or honorifics (e.g., patient, Miss, Mrs., etc.) in the clinical text by applying symbolic AI rules. The symbolic AI pipeline component may be a person heading NER construction module that identifies document headings related to a person (e.g., address block) in the clinical text by applying symbolic AI rules such as character case detection, font size detection, and other text format characteristics.

In another aspect, a method according to the invention provides for automated text anonymisation of clinical texts, the method configuring or instantiating an AI pipeline for detecting protected health information (PHI) in the clinical text including assembling one or more NER components for application to the clinical text; masking the detected PHI in the clinical text; and generating a de-identified clinical text output file, where the AI pipeline is composed of components that include at least one symbolic AI pipeline component. These symbolic AI pipeline components may store structured data such as labels, names, and codes in the form of lists, graphs (e.g. B-trees), or tables (e.g. relational database table). These symbolic structures facilitate the searching and identification of words, names, labels, or symbols that constitute PHI via symbolic rules and logic executable by a computer to process the clinical text. The method may begin by performing optical character recognition on a rasterized or imaged file to generate a clinical text.

The construction of the symbolic AI pipeline components may include importing or identifying one or more lists of terms that constitute PHI and require masking. These lists may be structured to assist with searching, comparison, and matching. The terms may also be provided in the form of regular expressions that enable wild card comparisons and other indirect matches. The construction may include defining conditional structures associated with one or more terms or one or more lists such as sentence placement, zoning placement, related tags, and other filtering information which may be used to eliminate false positives and false negatives. Once a clinical text is received, the symbolic AI pipeline may execute symbolic AI logic to parse the clinical text, tokenise text, recognize syntax, and/or compare or match strings with the terms, regular expressions, conditional structures, and/or labels which are stored as the symbolic AI masking recognition rules.

Clinical text often contains protected health information (PHI) such as patient names, medical conditions, birth dates, and other identifying information. Many applications using the clinical information in the clinical texts will require de-identification by either removing or masking personal health information in the clinical text to prevent the identification of an individual in order to comply with privacy laws or for commercial reasons particular to the collector of the health organisation that collects protected health information.

Anticipated use cases for the method and system include: hospital electronic medical record (EMR) notes, general practice EMR notes, fertility EMR notes, hospital discharge summaries, radiology reports, pathology reports, fertility reports, and any other medical text or transcripts. Furthermore, personal health information detection can also be used to drive audit processes because a health organisation may have a policy for its clinicians not to record or append protected health information to certain medical records to ensure security, privacy, and legal compliance. An automated personal health information detection process and system is contemplated for identifying instances of non-compliance with such a policy by analysing a large amount of text-based medical records. Remedial action can be proposed for clinicians such as education and training in specific cases of repeated non-compliance that is detected. Statistical information from aggregated detection campaigns can inform the leadership of the health organisation the severity and frequency of the non-compliance.

It is one advantage of at least one embodiment of the present invention to reasonably accurately detect and mask the following personal health information data types: person's name, date of birth, consultation date, other dates, patient's age/carer's age, any personal identification number (social security number, driver's license, passport number, etc), any residential or postal address, any phone or fax number, any e-mail address, any website/URL address, or any text corresponding to a profession. These personal health information data types are not required for training a machine learning model to perform inference on unseen data and generate useful medical predictions. These PHI items are classified as protected health information or personal information/sensitive information about an identified individual or an individual who is reasonably identifiable, and, therefore, their masking or removal enables the remaining or unmasked data of the medical text, report, or transcript to be used for model training.

Further aspects, advantages, and features of embodiments of the invention will be apparent to persons skilled in the relevant arts from the following description of various embodiments. It will be appreciated, however, that the invention is not limited to the embodiments described, which are provided in order to illustrate the principles of the invention as defined in the foregoing statements and in the appended claims, and to assist skilled persons in putting these principles into practical effect.

BRIEF DESCRIPTION OF THE DRAWINGS

Embodiments of the invention will now be described with reference to the accompanying drawings, in which like reference numerals indicate like features, and wherein:

FIG. 5 is a first example depicting clinical text before and after de-identification or anonymisation;

FIG. 6 is a second example depicting clinical text before and after de-identification or anonymisation;

FIG. 8 is an exemplary pathology report with anonymised PHI and zone indicators.

DETAILED DESCRIPTION

Figure 1:
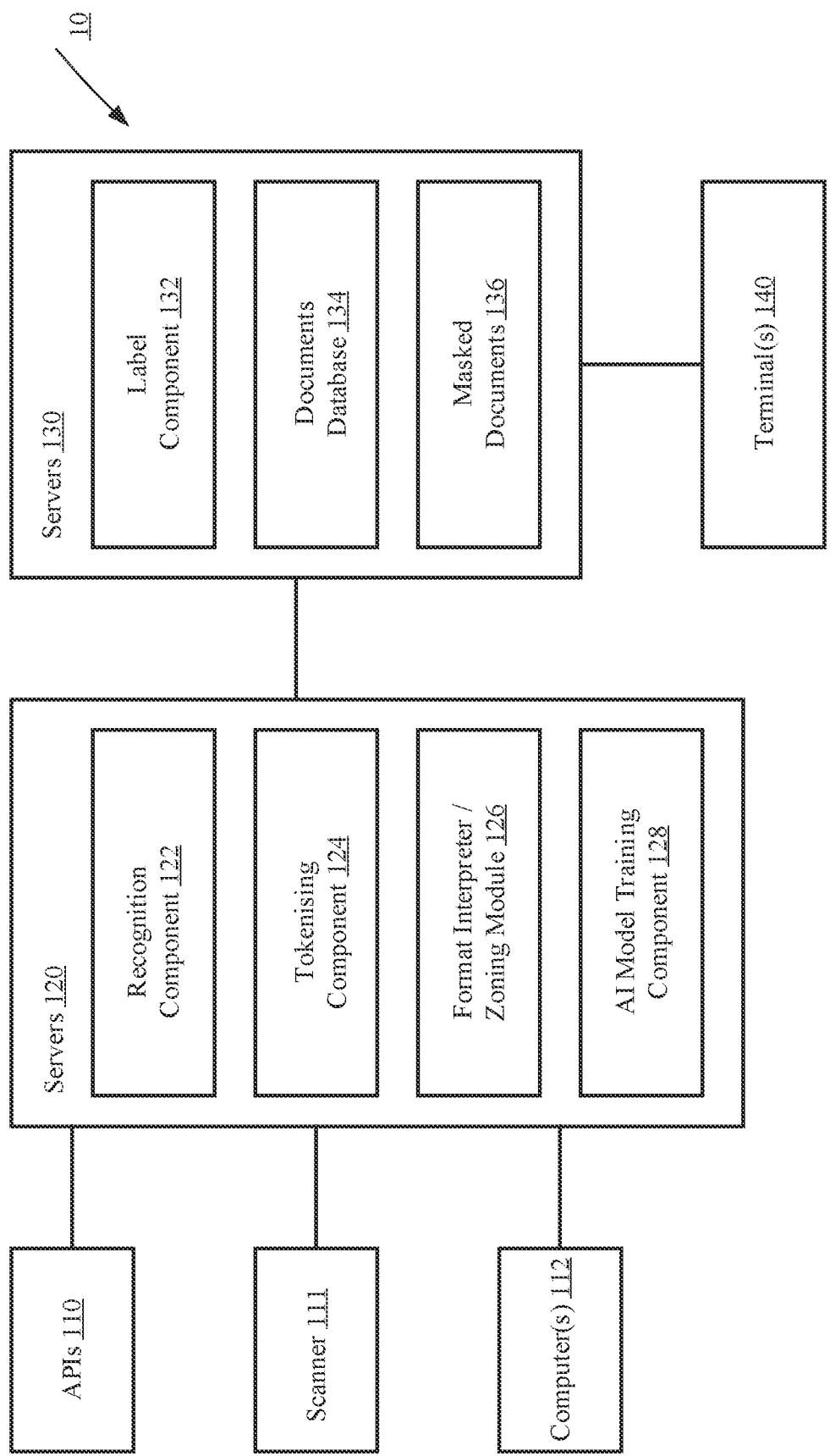
FIG. 1 is a system diagram of an automated text anonymisation in accordance with an implementation of the present invention.

FIG. 1 is a block diagram illustrating a system 10 for anonymizing PHI in clinical texts which are inputted to the system 10. The servers 120 of system 10 may connect to numerous devices that can transmit or upload clinical texts. These clinical texts may be in the form of image files (e.g. JPEG, PNG, TIFF), formatted documents (e.g. XML, HTML, PDF), text files, or other digital formats for textual information. These clinical texts may be uploaded from one or more computers 112 directly via a secure file transfer (e.g. secure copy protocol (SCP)) or via a secure web interface. The computers may be located in hospitals, doctors' offices, clinics, and other medical service locations and connect to servers 120 via internet protocols, virtual private networks, and other communication protocols. A scanner 111 in one or more of these medical service locations may also be connected to the servers 120 to provide scanned or digitised clinical documents to the servers 120. Together with the clinical text, the medical service provider may transmit related electronic health records (EHR) to the system 10 to inform the recognition component 122 of clinical report details including patient name, doctor name and other PHI which may need to be removed. The networks may be implemented over the internet, over TCP-IP protocols, or other wired and wireless transmission protocols.

The servers 120 may also receive documents, EHR, and requests via the application programming interfaces (APIs) 110 which may include an interface to upload documents for PHI detection (e.g. to auto-fill electronic medical records) and interface to upload documents to identify PHI and mask the PHI in the documents. These uploaded documents may also be stored on the servers 120 or deleted after processing depending on user requirements and settings. Another API may provide an standardized software interface exchanging standard packets (e.g. JavaScript Object Notation (JSON)) which may allow researchers to access masked documents for data analysis and medical research without compromising PHI or patient privacy. The APIs 110 may be hosted on the servers 120 as an application executed on processors to provide a standardized interface for external devices to connect with. The APIs 110 may be hosted on remote devices and configured to authenticate with a particular port or protocol at servers 120.

The servers 120 may include one or more processors, one or more non-volatile, non-transitory storage mediums, random access memory, input/output interfaces (e.g. gigabit ethernet, WiFi, universal serial bus, etc.) and/or operating systems being executed on such hardware. The servers 120 may be hardware assets dynamically accessible via the cloud or may be dedicated hardware or virtual machines executed on such hardware. Likewise, servers 130 may include one or more processors, one or more non-volatile, non-transitory storage mediums, random access memory, and/or input/output interfaces and may execute an operating system providing a platform for other applications and processing. The servers 120 and 130 may be collocated or on a virtual private network (VPN) or connected cloud assets such that information transfer is the same as if the servers 120 and 130 were one or more of the same servers. Indeed, in some implementations, servers 120 and 130 may be combined to operate on a single server or computer.

The tokenising component 124 may receive the parsed text or raw optical character recognition (OCR) text, or other text streams from the clinical report. The tokenising component 124 may generate tokens (e.g. text blocks, hashes or representational codes) from the informational items of words, characters or groups of words or characters (e.g. sentences, mailing codes, etc). The tokenising component 124 may include algorithms or scripts to break down text syntax and isolate strings of characters or words based on symbolic AI logic or AI neural models for natural language processing. These tokens of words or sentences may be filtered to remove common words (e.g. articles) or non-PHI words (e.g. verbs) and punctuation in order to reduce the number of tokens searched or compared at the recognition component 122. The tokenising component 124 may operate to correct mis-parsed words based on closest dictionary matches or other language information. Once the text of the clinical document has been tokenised, the tokenising component 124 may pass the tokens to the recognition component 122 or to the format interpreter 126.

The format interpreter or zoning module 126 may operate first on the document or clinical report to identify zones of the document based on typical clinical report zones or headers detected by a header detection NER component. The zoning module or format interpreter 126 may be formed of symbolic logic such as a keyword matching or NER or may be a machine learning process (e.g. computer instructions) that performs natural language processing (NLP) or a textual or pattern classifier (e.g. Haar classifiers, a neural network, or support vector machine). The zoning module may identify sentences, tokens, or blocks of document coordinates as zones or sections of the document. The zoning module may apply masks to an entire zone or may pass on zoning information to the recognition component 122 or the tokenising component 124.

A recognition component 122 may include computer programmable instructions that are executed on the processors of the servers 120 and may operate to process text of the uploaded clinical documents to identify PHI and/or to process tokens from processed text from the tokenising component 124. The recognition component 122 may include computer logic or scripts to break down text syntax and isolate strings of characters or words for matching by the symbolic AI rules or logic (if not passed tokens). Once the text has been structured and filtered (e.g. removing articles, verbs, punctuation, etc.), the recognition component 122 may group one or more words or characters according to syntactical relationships or learned/coded relationships (e.g. titles and names) of the symbolic AI logic. The recognition component 122 may execute NER processes, logic, or rules to identify PHI and output labels or metadata identifying the PHI in the document or clinical report.

The recognition component 122 may compare the filtered characters or words to lists, tables, and regular expressions that define PHI to be masked. This comparison may involve traversing a B-tree or selecting the term from a relational table or matching to a regular expression so that a portion or all of the string may be identified as PHI. The recognition component 122 may be a named-entity recognition engine based on symbolic AI logic or machine learning models.

Words, characters, or strings that have been identified as PHI by the recognition component 122 may be passed to the format interpreter 126 in order to add positional structure to the tokens such that tokens can be related to their neighbours on the page. That is, the tokens identified as PHI are assigned coordinates in an X-Y plane of the page. The format interpreter 126 may assign position coordinates (relative to the page) or position offsets (from page edges) to each of the identified tokens, words, or strings that have been identified as PHI by the recognition component 122. The format interpreter 126 may correct formatting errors of tokens, may remove punctuation, or may identify sentences or strings within the document text. Alternatively, the recognition component 122 may add the coordinates and compose the list of labels identifying the PHI.

The AI model training component 128 may train a zoning model in order to identify repeated PHI in headings, footers, and on the covers of documents, for example. These repeated portions of the document may then be assigned their own position coordinates for masking such that each repeated portion may be similarly masked. Zoning models may learn the format of a particular client's records based on repeated identification of PHI over multiple documents in particular zones. The zoning model may learn to identify letter head of a user and those of the user's client or referral businesses. The zoning model may be an AI machine learning model based on classifiers including an extreme gradient boost classifier, a light gradient boost machine, a gradient boosting classifier, naïve bayes, an ada boost classifier, a K-neighbors classifier, a decision tree classifier, a ridge classifier, natural language processing logic, recurrent neural networks (RNN), convolutional neural networks (CNN), multi-level perceptrons, feedforward neural networks, or a combination thereof. The AI model training component 128 may also store and execute the AI models (i.e. the zoning model) on the servers 120. The AI model training component 128 may train, store, and execute the machine learning tools 91-95 illustrated in FIG. 7.

The servers 130 may receive the identified PHI tokens or strings and their corresponding coordinates or offsets from the recognition component 122. The servers 130 may store these PHI tokens (labels) and offsets as in process element 40 of FIG. 4 in the label component 132. The servers 130 may also be passed the raw documents or text versions of the documents from servers 120. As a result, servers 120 merely process documents received from the outside sources (APIs 110, scanner 111, and computers 112) and do not also pose a security risk by storing or holding databases of raw or even masked documents. Once a document has been cleaned and processed by servers 120, the document along with any associated PHI labels and coordinates are transmitted to the servers 130 via the internet or gigabit ethernet.

The labels passed from the servers 120 to the servers 130 may be in the formats illustrated in FIGS. 5 and 6 and specifically in elements 501 and 601. That is, the type of label, the start/end coordinates, the original text of the label, a time shifted date, and/or the hashed name information. The labels corresponding to each instance of PHI may include other data useful to AI models for research such as context hashes, timestamps, tags, EHR elements, etc.

The servers 130 operate as database servers storing received data in relational tables or as specialized (.ents) files that correspond with each clinical document. The specialized file may store the masking information such as the associated document name, location, and positions of all PHI to be masked. The label component 132 may store these specialized masking files that each correspond to a clinical document or text. Likewise, servers 130 may store the corresponding original clinical document or text in the documents database 134. The original clinical documents may then be accessed later by care givers or medical service providers via authorized outside devices connected to APIs 110 or via authorized computers 112 or via terminals 140. Certain documents or certain databases (i.e. sub-databases) may only be authorized to certain users or terminals.

When a database is being (or is to be used) used for research purposes or by a user that is not authorized to view the PHI, then the corresponding specialized files (e.g. 020305-pathology-report.ents) may be applied to the original documents to mask the PHI of the original documents. The masking of the PHI may involve covering (i.e. redacting) or replacing character-for-character the PHI of the original clinical document. Such character-for-character replacement (e.g. Joel=****) allows the research algorithms processing the masked files to draw some inferences from the masked data while retaining full anonymity. The masked files which combine the original document information and the mask information of the corresponding specialized file may be saved together as a single file with extension masked, for example. Only such combined, masked files may be accessed by non-authorized or non-medical service providers. Accordingly, these files are retained while in use in a separate database the masked documents 136 database. Terminals 140 and APIs 110 may provide access to this masked-documents database 136.

Figure 2:
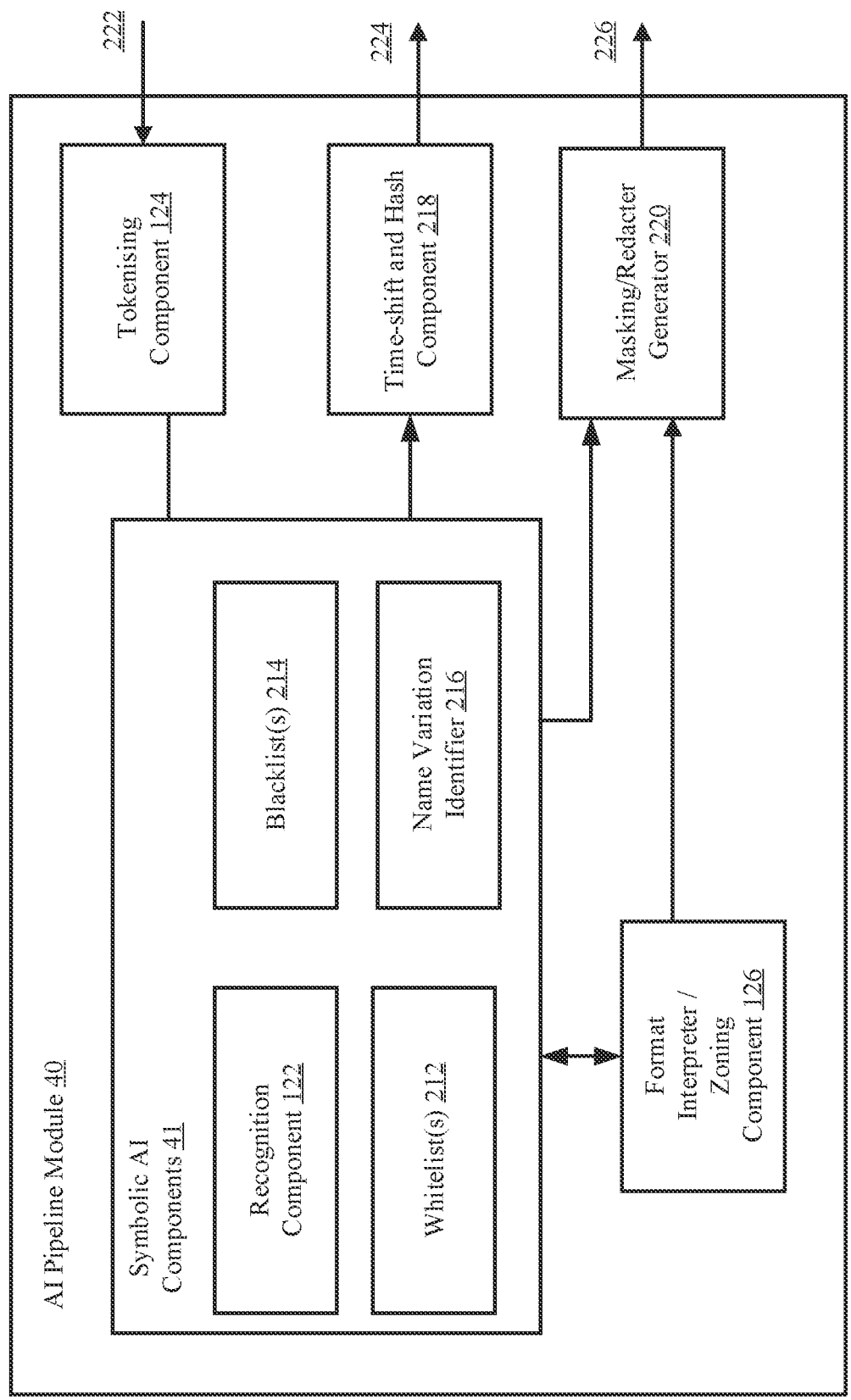
FIG. 2 is a system diagram of the PHI identification components of the automated text anonymisation in accordance with an implementation of the present invention.

FIG. 2 is a system diagram of the AI pipeline module 40 that forms the network of components executed on servers 120 to process the clinical documents for identification and localization of PHI. The AI pipeline module 40 may receive clinical reports, EHR streams, and text information at input 222. Upon start up, the AI pipeline module 40 may instantiate and configure one or more pipeline components including the tokenising component 124, the symbolic AI components 41, the time-shift and hash component 218, the format interpreter and zoning component 126 and the masking/redacter component 220. The AI pipeline module 40 may also instantiate and configure the AI model training component 128 and the machine learning tools 91-95 of FIG. 7 which assist the AI pipeline module 40. Configuration may include passing test information through the pipeline, connecting components including those executed separately, and incorporating additional information from the client or medical service provider into the appropriate components.

Figure 4:
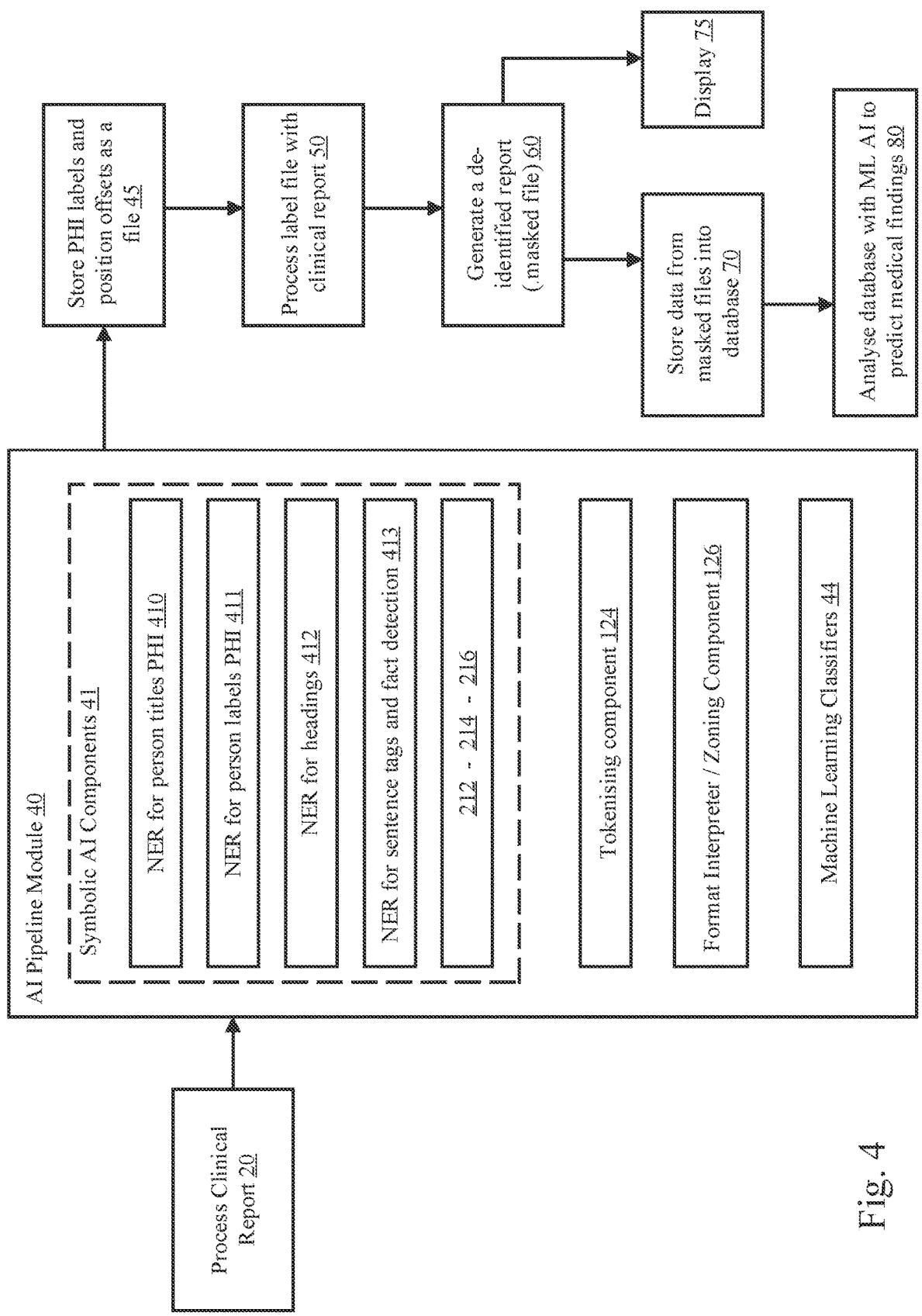
FIG. 4 is a block diagram of a system and process for automated text anonymisation of clinical text in accordance with an implementation of the present invention.

The symbolic AI components 41 may encompass the various named-entity recognition (NER) logic blocks 410, 411, 412, 413 illustrated in FIG. 4 as part of the recognition component 122. The recognition component 122 may include a title NER processor 410, a label NER processor 411, a headings NER processor 412, and a sentence and fact detection NER processor 413 and other NER processes as listed herein. These NER logic blocks as well as other matching logic, conditional logic, or search logic (e.g. tree traversals) may recognise PHI in the clinical documents. The identified PHI may be hashed or time-shifted by component 218

The recognition component 122 is supported by blacklists 214 that may include difficult to identify PHI terms or names (e.g. Will, the name) and is supported by whitelists 212 that may include terms or names that often trigger false positives for PHI (e.g. Johnson and Johnson). These lists may be applied after the recognition component 122 has provided initial processing so as to filter and correct the PHI identification of the recognition component 122. After processing, terms in the blacklist may have been identified by the recognition component 122 and the blacklist 214 such that all such terms are identified as PHI. Likewise, terms in the whitelist 212 should be passed on as non-PHI despite identification by the recognition component 122 as PHI. The name variation identifier 216 may operate on tokens or words to replace similar names with blacklisted or whitelisted terms or tokens such that the name variation identifier 216 operates to expand the blacklists 214 or whitelists 212 (e.g. with mis-spellings).

The symbolic AI components 41 may transmit identified PHI to the format interpreter 126 which may generate coordinates for each element of PHI and may transmit tokens or PHI to the zoning model which also identifies document portions and sections based on the PHI and surrounding context (e.g. larger or smaller fonts). As indicated in figure, the zoning component 126 assists the symbolic AI component 41 with two-way flow of information and may operate before recognition begins. This may reduce the recognition time and increase accuracy as the zoning component 126 may determine entire headings and pages qualify for masking before recognition of PHI begins.

The position coordinates for the PHI and for the various zones or regions identified by the format interpreter and zoning module 126 are transmitted to the label and redacter generator 220 which may assemble the PHI labels into label files (e.g. file-labels.ents). Additionally, PHI tags (e.g. NAME, DOB) may be transmitted to the masking generator 220 from the symbolic AI components 41 based on the types of PHI identified. For some types of PHI, the PHI may be time-shifted (e.g. 10 days added) or the PHI text may be hashed to preserve anonymity. Then after being time-shifted or hashed, the adjusted or anonymised PHI may be supplied to the masking generator 220 to be included in the label file. Additionally or alternatively, the anonymised PHI may be sent separately by secure connection to server 130 before inclusion in the label file. These label files from the masking generator 220 are then transmitted to servers 130 and/or stored in non-volatile memory or storage media. The labels may include information as shown in elements 501 and 601 of FIGS. 5 and 6 and other information. As used herein, masking may be replacement of PHI characters or text with arbitrary text or replacement characters (e.g. #) whereas redaction may include text removal, pixel blackening, and other more complete removal methods.

A non-symbolic AI system such as the zoning model may be formed by training layers of a neural network or other connections in an AI model. Based on the identification of training data from relevant medical studies and medical images (and medical condition findings for such images), a deep learning model, or other trainable machine learning algorithm, may be trained. This training may include various activities to train multiple layers of the deep learning model, through correlations, statistical modelling, and supervisions as applicable (e.g. supervised by symbolic AI components). Additional operations may occur with use of the trained deep learning model to verify training results and assessment accuracy, with such verifications potentially occurring during the training process or as adjustments subsequent to detection operations. It will be understood that variations to the above-described training model may occur based on the pathologies, conditions, and cases to detect within images that can be considered as critical, hard-to-detect, or abnormal. Further, the training of the model may involve various operations to search and analyse report data (and find most representative images) based on criticality, urgency, image clarity, portrayal, or like characteristics. These trained models may be used for various identification and categorization operations of components of the AI pipeline for PHI masking as described below.

In this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Hardware may include conventional personal computer architectures, or other general-purpose hardware platforms. Software may include commercially available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the present invention, for ease of explanation and understanding the exemplary embodiments described herein are based upon single-processor general-purpose computing platforms, commonly available operating system platforms, and/or widely available consumer products, such as desktop PCs, notebook or laptop PCs, smartphones, tablet computers, and so forth.

The terms component, logic, module, algorithm, and generator may include one or more computer readable and/or executable instructions that when executed by a hardware processor cause the processor to perform operations of the component, logic, module, or generator. The executable instructions may include data structures which are traversed, searched, or processed by the processor as a part of the operation. The computer instructions may be stored on non-volatile, non-transitory computer-readable storage media.

In particular, the term 'processing unit' is used in this specification (including the claims) to refer to any suitable combination of hardware and software configured to perform a particular defined task, such as generating and transmitting data, receiving and processing data, or receiving and validating data. Such a processing unit may comprise an executable code module executing at a single location on a single processing device, or may comprise cooperating executable code modules executing in multiple locations and/or on multiple processing devices. For example, in some embodiments of the invention, processing may be performed entirely by code executing on a server, while in other embodiments corresponding processing may be performed cooperatively by code modules executing on the secure system and server. For example, the system may employ application programming interface (API) code modules, installed at the secure system, or at another third-party system, configured to operate cooperatively with code modules executing on the server in order to provide the secure system with useful services.

Software components may be developed using any suitable programming language, development environment, or combinations of languages and development environments, as will be familiar to persons skilled in the art of software engineering. For example, suitable software may be developed using the C programming language, the Java programming language, the C++ programming language, the Go programming language, and/or a range of languages suitable for implementation of network or web-based services, such as JavaScript, HTML, PHP, ASP, JSP, Ruby, Python, and so forth. These examples are not intended to be limiting, and it will be appreciated that convenient languages or development systems may be employed, in accordance with system requirements. Any of these languages may be compiled or interpreted so as to be executed on hardware processors of servers 120/130 or computers 112, or terminals 14, or the like.

As also shown in FIG. 1, the server 120/130 comprises a processor. The processor is interfaced to, or otherwise operably associated with a non-volatile memory/storage device, which may be a hard disk drive, and/or may include a solid-state non-volatile memory, such as ROM, flash memory, or the like. The processor is also interfaced to volatile storage, such as RAM, which contains program instructions and transient data relating to the operation of the server.

In a conventional configuration, the storage device maintains known program and data content relevant to the normal operation of the server. For example, the storage device may contain operating system programs and data, as well as other executable application software necessary for the intended functions of the server. The storage device also contains program instructions which, when executed by the processor, instruct the server to perform operations relating to an embodiment of the present invention, such as are described in greater detail. In operation, instructions and data held on the storage device may be transferred to volatile memory for execution on demand.

The processor is also operably associated with a communications interface in a conventional manner. The communications interface facilitates access to the data communications network. In use, the volatile storage contains a corresponding body of program instructions transferred from the storage device and configured to perform processing and other operations embodying features of this AI pipeline. The secure system may be any computing or processing system requiring authentication of end-users prior to permitting access and/or the performance of transactions on behalf of those users.

Figure 3:
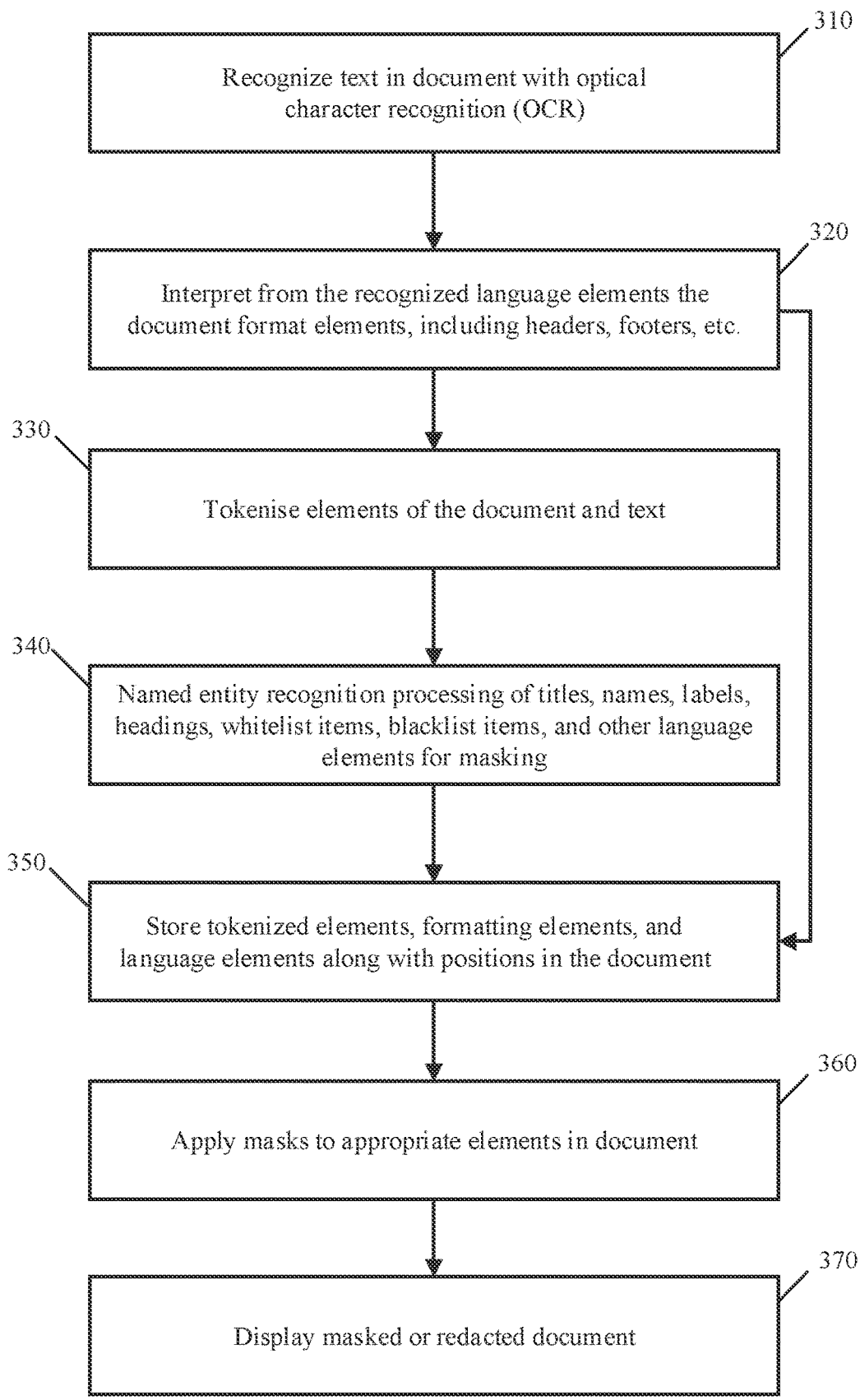
FIG. 3 is a process diagram of an automated text anonymisation process in accordance with an implementation of the present invention.

FIG. 3 is a process diagram that illustrates a series of processes that intake clinical documents and produce masked and anonymised clinical documents. At 310, if the clinical document has only image information, an optical character recognition process may be performed on the clinical document to generate text at appropriate places in the document. At 320, the system 10 may interpret, based recognized language elements and PHI or pattern recognition, certain document format elements including headers, footers, etc. At 330, the text and other elements of the clinical document may be tokenised for easier processing and searching, where tokenising includes separating the textual information and graphical information into syntactical pieces (e.g. sentences, punctuation, figures, titles). For text documents, at 340 one or more named entity recognition processors perform processing of titles, names, labels, headings, whitelist items, blacklist items, and other language elements for masking (i.e. PHI). At 350, the system 10 may store the tokenized elements, formatting elements, and language elements along with their positions the document in one or more files corresponding to the input clinical document. At 360, the system 10 may apply masks in a character-for-character replacement of the identified PHI stored in the specialized file corresponding to the original document to be masked or may apply redactions to the original document. At 370, the system 10 may display the masked or redacted document on terminal 140 or may store the redacted file in a non-transitory storage medium in a separate database.

For present purposes, with reference to FIG. 4, a brief overview is now provided that combines certain components of FIGS. 1-2 and processes of FIG. 3. Broken lines shown in the system 10 may represent communications between an endpoint device, a secure system, and the server 120/130. At 20, the system 10 begins by processing each clinical report/ document in text file form sequentially to identify PHI.

The following example PHI types are ultimately detected and masked by the system 10:
NAME Person names, e.g., patient, doctor, carer
DATE A date related to a person
AGE Person ages, e.g., patient, carer
ID Any personal identification number
PHONE_OR_FAX Any phone or fax number
EMAIL Any email address
WEBSITE Any website
ADDRESS Any residential or postal address
PROFESSION Any profession Additional PHI may be detected as required by law or described herein. The capitalised phrases above may operate as tags for their respective PHI in a label file. Typically, masking is sufficient to de-identify PHI in accordance with national laws. Specific instances of personal health information may be redacted in the text or may be replaced character-by-character with placeholder characters (e.g., *, #, or -). Redaction requires masking identified named entity mentions with a high level of accuracy in order to comply with national health information privacy standards.

In one embodiment, a Python package or library, such as SpaCy, is executed to tokenise the text of the clinical report using natural language processing (NLP) techniques. Personal health information that is present in the clinical text is replaced in the clinical text at the same position or same offset with a common character, e.g., "CHEST X-RAY" is replaced by "********". Each * may represent a character of the original PHI string detected by the tool, for example. The character length of the redacted portion is the same as the original character length of the original personal health information. This may be called masking of the PHI.

In one embodiment, spaCy Named Entity Recogniser (NER) is executed to perform detection on DATE mentions in health data. Some anatomical mentions are occasionally detected as DATE and need to be repaired via a whitelist 212 entry. A spaCy named entity recogniser is executed to detect PERSON and DATE mentions. ADDRESS and PHONE NER detectors may also be applied to the clinical text. A rules baseline for PERSON and DATE_OF_BIRTH is developed in symbolic AI as described in more detail below. Initially, spaCy is used for DATE identification. An evaluation tool is developed to facilitate application benchmarking of accuracy. PATIENT and DOCTOR may be merged into NAME by the symbolic AI component 41. DATE_OF_BIRTH and CONSULTATION_DATE may be merged into DATE by the symbolic AI component 41. Attribute annotations are included for subtypes. Evaluation data sets may be developed and benchmarked against known expensive software-as-a-service (SaaS) services that are used for de-identification such as AWS Comprehend. Note that AWS Comprehend suffers from being US-centric and, therefore, it would not be accurate for non-US populations/data. Alternate products to AWS Comprehend (for example, Prodigy and Snorkel) do not provide end-to-end functionality for development.

NER detectors are added for remaining PHI types such that symbolic NER rules form the recognition component 122 and symbolic AI component 41 which identify the PHI. Specifically, the AI pipeline module 40 of FIG. 4 provides an NER for person titles 410, a NER for person labels 411, a NER for document headings 412, and a NER for sentence tags and fact detection 413 which may comprise multiple NER processes. These are provided in addition to name NERs and date NERs as described above.

The system 10 may be accessed as a modular micro service via Application Programming Interfaces (APIs) 110. Two APIs may be implemented for example: (1) personal health information detection for electronic health record matching/assignment—Given an input text, return list of detected personal health information (type, text, start_char, end_char); and (2) personal health information masking— Given an input text, return masked text as well as personal health information in a list with coordinates of PHI.

In addition to default core detection capabilities, the system 10 supports project-specific adaptation. Primary functionality for these adaptations includes: applications for post-hoc evaluation of sensitivity and specificity; applications for developing new pattern and context-based detection rules; applications for developing new machine learning detection models; applications for using rules to bootstrap or accelerate the learning of machine learning models; and protocols and applications for deploying API and any supporting non-symbolic AI models or classifiers. These are described in more detail with respect to FIG. 7. These applications or tools 91-95 may form machine learning classifiers 44 of AI pipeline module 40.

The system 10 also provides methods for developers and domain experts to adapt the system 10 to a specific dataset for applications like de-identification where sensitivity/recall is extremely important. In particular, the system 10 separately stores, at 45, the identified PHI labels along with their positions in separate files so that the original clinical documents may be preserved and masking/redaction may be easily applied or executed based on the corresponding PHI file. That is, at 50, the label file is applied to the clinical document to produce a de-identified report at 60 as a masked file. The data from the masked file may then be processed as a part of a big data analysis process or for research into a database, at 70, with the assurance that PHI is kept private. The masked document may also be displayed on a computer display at 75. Then, via terminal 140, a researcher may use or view documents or aggregate date from this PHI-free database to predict medical findings, for example, at 80. The masked file may contain hashed or time-shifted information as well as non-PHI which has been applied from the label file.

Core detection rules/models may be developed over public data sets that are already de-identified and injected with realistic synthetic/dummy PHI for practice, training, and benchmarking data sets. Core functionality includes general-purpose, rule-based components that can be used to bootstrap PHI detection for new data and new data types. That is, strict rules or general-purpose rules may build a dataset of PHI that can be restructured to identify and create fuzzier datasets, knowledge graphs, and decision trees that are more conditional and more context dependent. Furthermore, these higher-order (e.g. higher-complexity, context dependent, deeply structured, conditional) symbolic AI rules and logic may form the basis for training a non-symbolic AI model such as a machine learning (ML) model or a neural model (e.g. CNN, RNN). That is, the output of the ML model would be compared against the symbolic AI model during training of the ML model such that the symbolic AI model provided the accuracy rejections and error identification needed to train the ML model (rather than more brute force or manual methods). The machine learning classifiers 44 to predict named entities, part-of-speech tags, and syntactic dependencies may be ML models trained in this manner to support the symbolic NER AI models in symbolic AI component 41.

The description of symbolic AI pipeline components 40, and specifically the document format and tokenisation components 46 are provided below; additionally, various PHI named-entity recognition detectors and PHI fact detectors are set forth below in detail in these tables.

The document format and tokenisation processes 124/126 may include software components such as those below:

| Name | PHI types | Description |
| --- | --- | --- |
| retokeniser | N/A | Fixes tokenisation issues, e.g., x-ray, "&" |
| newline_segmenter | N/A | Adds additional sentence boundaries at newlines. |
| sentencizer | N/A | Detects sentence boundaries (from spaCy library). |
| tokeniser | N/A | Cleans text to remove extra whitespace. This makes it easier to write rule-based detectors. Keeps mapping so output is |

-continued

| Name | PHI types | Description |
| --- | --- | --- |
| | | with respect to original text. Runs tokeniser from spaCy library to split text into word tokens. |

These software functions may be applied to parsed text and may be applied before or after PHI detection so as to improve the text for further data processing by researchers and clean up OCR artifacts. PHI NER detectors which may be provided with the system 10 or system 1000 in the symbolic AI components 41 may include:

| Name | PHI types | Description |
| --- | --- | --- |
| age_ner | AGE | Detects mentions of patient ages based on patterns and context, e.g., 73 year-old, 35F. |
| date_ner | DATE | Detects mentions of dates and validates by inferring working strptime format, e.g., 17/04/1943, 17th of April 1943. |
| email_ner | EMAIL | Detects mentions of emails. Uses spaCy LIKE_EMAIL attribute. |
| id_digits_ner | ID | Detects mentions of identifiers comprising 6 or more numeric digits, e.g., 123987. |
| medicare_number_ner | ID | Detects mentions of Australian Medicare numbers and validates checksum, e.g., 2123 45670 1. |
| person_heading_ner | NAME | Detects mentions of person names in report titles with particular patterns, e.g., CT BRAIN - JEREMY HUMPHREY. |
| person_label_ner | NAME | Detects mentions of explicitly labelled person names, e.g., PATIENT: Sirius Black. |
| person_qualification_ner | NAME | Detects mentions of person names based on qualifications, e.g., Shannon Rogers FRACP. |
| person_reportee_ner | NAME | Detects mentions of the person a finding is delivered to, e.g., discussed with Jo Tse. |
| person_reporter_ner | NAME | Detects mentions of the person who delivers a finding, e.g., discussed by Harold Owens. |
| person_salutation_ner | NAME | Detects mentions of person names in letter salutations, e.g., Dear Bob. |
| person_signature_ner | NAME | Detects mentions of person names in letter signatures with particular patterns, e.g., DR BOB ROBERTS kms. |
| person_title_ner | NAME | Detects mentions of person names based on titles, e.g., Dr Edward Hanson. |
| person_typed_by_ner | NAME | Detects mentions of transcriptionist or typist, e.g., Typed by: PB. |
| phone_or_fax_ner | PHONE_OR_FAX | Detects mentions of |

-continued

| Name | PHI types | Description |
| --- | --- | --- |
| | | Australian phone and fax numbers, e.g., +61 411 111 111. |
| website_ner | URL | Detects mentions of URLs. Uses spaCy LIKE_URL attribute. |

Likewise, PHI fact detectors may be provided with the system as symbolic AI functionality or logic as a part of symbolic AI components 41 and specifically component 413. These fact detectors may isolate more difficult to identify PHI such as string date formats or numbers as ages. The fact detectors may also identify or check with conditional logic if identified PHI is protected or not, or for example, a date of birth or a regular date. These fact detectors may include:

| Name | PHI types | Description |
| --- | --- | --- |
| phi_relex (is_dob) | subject: DATE Span predicate: is_dob object: True\|False | Detects whether a given DATE mention is a date of birth, e.g., DOB: 17/04/1943. Stored in is_dob attribute. |
| phi_relex (strptime_format) | subject: DATE Span predicate: strptime_format object: format str | Detects strptime format for a given DATE mention. Stored in strptime_format attribute. |
| phi_relex (strftime_format) | subject: DATE Span predicate: strftime_format object: format str | Detects strftime format for a given DATE mention. Stored in strftime_format attribute. |
| phi_relex (is_protected_age) | subject: AGE Span predicate: is_protected_age object: True\|False | Detects whether given AGE mention is protected, i.e., 80 or higher. Stored in is_protected_age attribute. |

Figure 7:
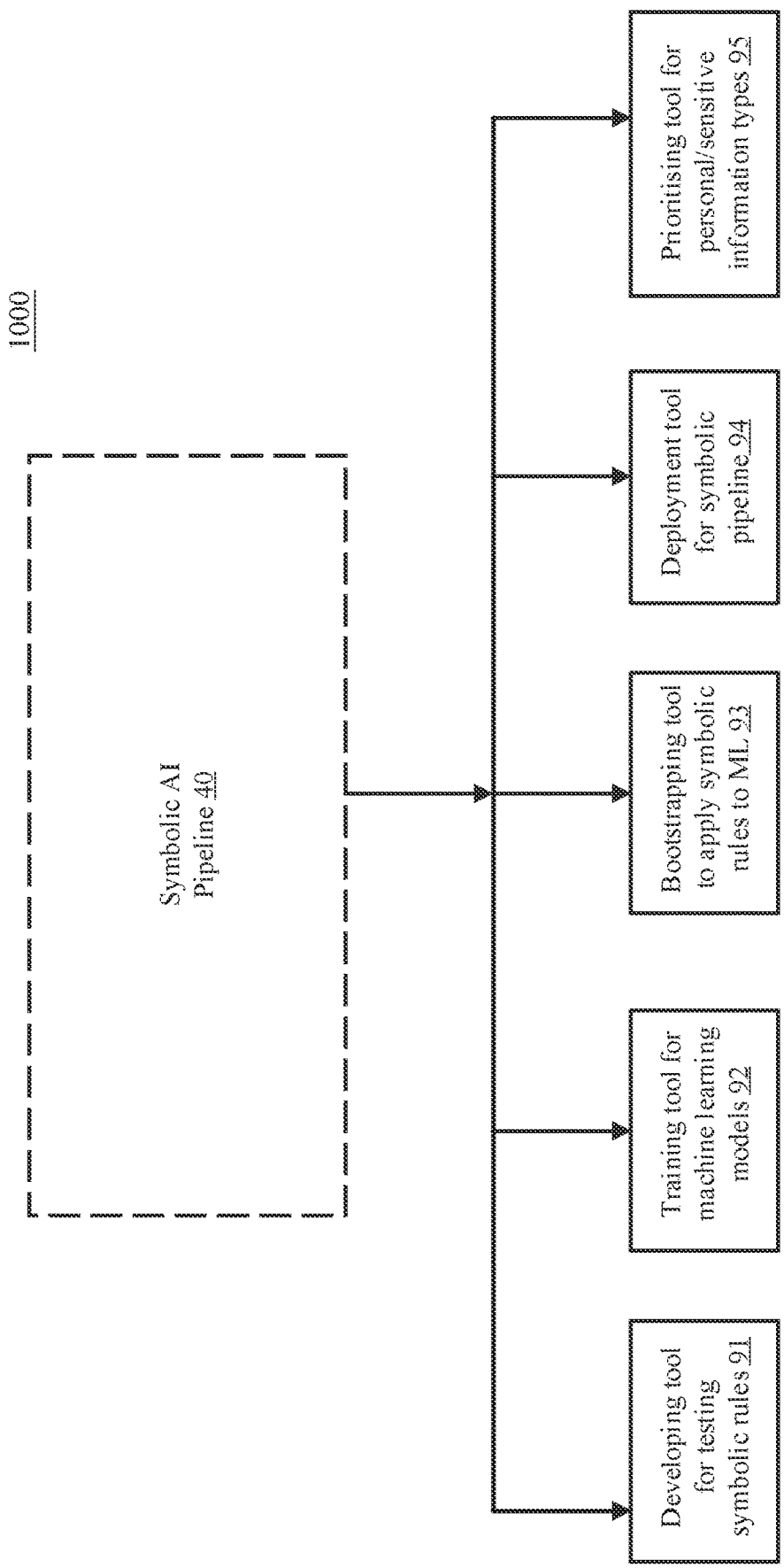
FIG. 7 is a block diagram of a software toolchain incorporating the system of FIG. 2 into an AI toolchain for continuous improvement of the automated text anonymization.

A software application/tool 91 of FIG. 7 is created, configured, or adapted for developing and testing symbolic AI rules. Specifically, the software application 91 may generate test clinical reports, test PHI cases, or insert synthetic PHI into documents to test the accuracy of the PHI rules. The synthetic PHI text may be generated by the same symbolic AI rules that are used for PHI detection or location accuracy on a page or zone detection or other capabilities of the system 10 or broader system 1000 and symbolic AI components 41.

A software application/tool 92 of FIG. 7 is created, configured, or adapted for teaching machine learning (ML) models with the symbolic AI logic and rules of symbolic AI component 40. During the testing and validation stages of the ML models, each output (e.g. identified PHI) may be compared or input into the symbolic AI for error checking. Thus, rather than error checking the ML model against a vast training dataset (which results in over-fitting and other errors), the software application 92 advantageously provides real-time error checking for the ML model during training execution. The software application 92 may form an interface between an ML model and the symbolic AI logic so as to provide the identified PHI from the ML model along with contextual information (e.g. position and surrounding text) to the symbolic AI logic for error checking. The software application 92 may then return true/false or more detailed information such as the true nature of the erroneous PHI (e.g. DATE instead of DOB).

A software application/tool 93 of FIG. 7 is created or adapted for using rules to bootstrap machine learning models or accelerate the learning of a ML model. Specifically, the software application 93 may translate one or more symbolic logical rules or decision trees from symbolic AI logic components 41 into neural layers or ML model connections to begin a more conventional training of the ML model on a training data set. In this case, the software application 93 provides the initial logic for the ML model to reach appropriate accuracy so that the ML model can improve by dataset training thereafter in ways that the symbolic AI model cannot improve. That is, advantageously, the ML model is instantiated with a foundational knowledge from the symbolic logic and is then allowed to focus on its strengths during training thereafter. The symbolic AI logic components 41 may also automatically label training data for the ML models to form a basis for beginning for training of the ML model. An ML model may be iteratively trained by software application 92 and 93 so that strengths from both modes are attained by the ML model. Ultimately, the system 10 may switch processing of the recognition component 122 over to the ML models trained by the software applications 92/93 or ensemble the ML models as additional NER detectors in the AI pipeline of AI pipeline module 40.

Software applications and tools 94 are created or adapted for deployment and monitoring of the symbolic AI models. For instance, if an error is detected after processing, the application 94 may alert or update the symbolic AI logic or the appropriate NER process. Deployment may involve installation, securing connections via APIs, and other initialization processes of the system 10 to begin processing of clinical documents.

In the system 10 or system 1000, PHI types are prioritised and core detectors are extended as required and as much as possible over public or mock data sets. An initial software application tool set 95 is developed for operation and development of PHI detectors, especially NER detectors which may involve the automated creation of symbolic AI logic. Support for PHI de-identification is provided by system 10.

The system 10/1000 is extended to adapt automatically to user type, e.g., a domain expert (i.e. specialised clinician), or machine learning (ML) engineer. Likewise, PHI audit functionality is supported due to the symbolic AI logic. Such an extension enables the complexity/specifics typically expected by AI engineers to be abstracted away in order for domain experts knowledgeable about the clinical data to be able to intuitively and easily use the system 1000. State-of-the-art Named-entity recognition (NER) systems for English produce near-human performance. For example, the best system entering MUC-7 scored 93.39% of F-measure while human annotators scored 97.60% and 96.95%. FIG. 8 illustrates a test clinical report used to test a pure machine learning model which cannot achieve such results.

A whitelist generating module is provided that is configured to generate whitelists 212 based on frequency of words in a large dataset. Words that appear in more than a predetermined number of documents are considered non-identifying of an individual. The corresponding de-ID component takes text as input and masks any words that do not appear in the whitelist.

A blacklist receiver module connected to AI component 40 is configured to receive, process and use blacklists 214 transmitted by users over APIs 110, for example. These blacklists 214 can be manually created by users or automatically generated from metadata accompanying report text from a clinical report. The corresponding de-ID component takes text as input and masks any words that appear in the blacklist.

A name variation module is configured to generate name variations for matching in different contexts, e.g., normal versus upper-case sentence. The corresponding components use these variations in combination with blacklist de-ID. Likewise, the system 10 may provide a component that uses blacklist de-ID to detect and mask occupation mentions.

Clinical text documents often have internal structure and PHI that is salient to interpretation and use by researchers and medical AI prediction models. Consider the example pathology report 500 depicted in FIG. 5. First, the PHI labels are identified (e.g. "20 Oct. 2012" and "Sally Hooper") in the original report as well as their locations. This information is recorded in 501 as a label file (which may form a specialized .ents file). The identified PHI may be removed from the clinical report document. This process results in an anonymized report of 502. All metadata that contains personal information (PHI) is de-identified by any of (i) direct hashing, (ii) N-GRAM hashing, (iii) aggregating, (iv) text removal, or (v) text replacement. The label file 501, however, may record important information such as names and dates in an anonymized manner so that researchers have some information on which to base analysis. Here, the two doctor names have been removed, and are replaced by hashes. The three dates in the report have all been recorded in a shifted manner such that the recorded date is 10 days later than the original date. The hashes and the amount of time added or subtracted may be arbitrary so long as it is kept consistent across the database (e.g. Dr. Hooper is always "tfidSDifBr"). Thus, for simplicity, hashes may be deterministic.

For hashing, the hashing and time-shifting component 218 may perform the hash of the identified PHI. Specifically, the hashing may be N-Gram hashing which duplicates and hashes specific characters of a word or phrase into binary strings. That is, N-gram operates much like a replacement cipher replacing characters with a randomized, but consistent key. This allows AI models to still do probabilistic or fuzzy matches between names that are mis-spelled. For instance, "Joe" may be hashed as "01001011" whereas Joel may be hashed as "01001010" such that output block sizes are uniform without padding (i.e. by deterministically repeating characters from the word). That is, for each ASCI character or Unicode character, the system may have a hash table with a corresponding character, code, or binary string that is used to replace the PHI character. Any unique identification may be hashed in such as way. Applying a N-GRAM hashing technique to several fields sufficiently de-identifies that personal information, whilst still allowing for record linkage within and between the datasets. The key or hash table is not retained to kept with the de-identified document so recovery of the key and the PHI is difficult.

For time shifting, the hashing and time-shifting component 218 may standardise the dates in the label file and add or subtract a given or arbitrary (but consistent) amount of time to the date. Dates are important in medicine for diagnosis probabilities (e.g. holiday related diseases) or to predict and analyse the progression of disease. As in FIG. 5, dates may be standardised as mm/dd/yyyy or dd/mm/yyyy or other formats and then time in months, days, and/or years may be added to the dd, mm, and yyyy fields. Likewise, hours and minutes may be standardised as seconds and a certain amount of second are added/subtracted consistently to the converted time in seconds.

All de-identification methods used herein provide a trade off between utility and security of the PHI. The de-identification method implemented for a type of PHI may be proportional to the level of risk that the PHI type has for re-identification of an individual or proportional to its usefulness. The following is a list of methods which may be used in the de-identification process: (1) retain PHI (no change to data); (2) hash the PHI (one-way deterministic hashes or non-deterministic hashes); (3) time-shifting the dates and times deterministically; (4) redaction (A process that detects graphical text in the pixels of the document and removes it); (5) masking (A process that detects PHI in the report and replaces it with a single character, character-for-character); (6) Removal (remove the PHI); (7) Aggregation (reduce the granularity of the information); and (8) differential privacy (add false arbitrary data that will not change the aggregated outcome). Postcodes from patient addresses may be aggregated to ensure sufficient population per aggregated group, and then apply N-gram hashing to the aggregated postal code for secure record linkage (e.g. for use in finding cancer clusters).

Similarly, in FIG. 6, the clinical report 600 is analysed by the symbolic AI component 41 and PHI labels 601 are identified, and removed to form an anonymised report 602. In this example, the identified PHI is only labelled and redacted by applying the positions in the label file and overwriting pixels of the document with black pixels. Each position or integer between start and end of a label position may correspond to a given redaction width (e.g. depending on resolution). The tag identifying the type of PHI is retained in the label file.

Zoning Module

FIG. 8 is an example pathology report where the machine learning analysis of the zoning module has been applied. The lines or areas corresponding to the HEADER, CLINICAL, and FINDINGS sections have been identified. These may also be stored in the label file with corresponding tags. Furthermore, specific PHI has been masked with masking character # in this example. The masking generator 220 may determine that the HEADER provides no useful information after masking and redact or mask the entire HEADER. This example could be broken into the following report sections:

| Section Type | Section Description |
| --- | --- |
| HEADER | Spans of text describing identifiers, addresses, openings, etc. |
| CLINICAL | Spans of text describing clinical context |
| CONCLUSION | Spans of text describing diagnosis or summarising interpretation |
| FINDINGS | Spans of text describing findings |
| FOOTER | Spans of text describing page numbers, sections, etc. |

A zoning module is provided that can be applied to the following use cases: (1) Hospital EMR notes; (2) General practice EMR notes; (3) Fertility EMR notes; (4) Hospital discharge summaries; (5) Radiology reports; (6) Pathology reports; (7) Fertility reports; (8) Any other medical text or transcripts.

The zoning module 126 may be configured to perform the task of de-identification using ML models for spatial identification and categorization. One particularly relevant use case is de-identifying personal/protected health information (PHI), where HEADERS and FOOTERS have been discovered to have a high probability of containing high density of PHI and have little or no clinical information relevant to downstream processes, for example, that are useful for training an AI model. Once detected, the zoning module 126 can mask or remove these section types and along with them all of the PHI that the section type contains.

The zoning module or format interpreter 126 is configured for additional uses after de-identification. Zone information produced by the zoning module 126 is also useful to downstream tasks. Example downstream tasks include: (1) When learning to generate a report based on an image, the zoning module 126 may only generate FINDING and CONCLUSION zones; (2) When identifying studies to prioritise for annotation, the zoning module may only look or search FINDING and CONCLUSION zones; and (3) Where the zoning module may lack an original referral or structured clinical records, the zoning module can extract clinical context from CLINICAL zones. The zoning module may include segmenting a text document into spans according to zone types defined and annotated by user.

Operation API

The operation API supports easy deployment as a modular library for segmenting text documents into zones. The primary functionality of the operation API may be: (1) Load a model and apply to a text document; and (2) Use the AI pipeline inside another application.

Development Tools

A development tool supports project-specific training of machine learning models for segmentation. This is designed for use by data migration, integration engineers and domain experts. The primary functionality of these development tools may include: (1) Procedure and tool for rapid annotation of text documents; (2) Tool displays one line at a time; (3) User enters keyboard shortcut to assign zone label; (4) Tool automatically applies label to rest of paragraph; (5) User can use keyboard short cut to go back and change previous labels; (6) Tool stores data and corresponding labels; (7) Tool for training a model stored data and labels; (8) Tool for post-hoc evaluation of sensitivity and specificity; and (9) Procedure and tools for deploying AI models.

It should be appreciated that while particular embodiments and variations of the invention have been described herein, further modifications and alternatives will be apparent to persons skilled in the relevant arts. In particular, the examples are offered by way of illustrating the principles of the invention, and to provide a number of specific methods and arrangements for putting those principles into effect. The disclosed systems or methods may not be limited to medical fields or the detection of PHI. Rather these systems and methods for anonymisation may be used to detect personal information in national security applications for redaction of field reports, in political surveys, and in university studies or surveys that may be subject to privacy rules (e.g. institutional review boards), for example.

Accordingly, the described embodiments should be understood as being provided by way of example, for the purpose of teaching the general features and principles of the invention, but should not be understood as limiting the scope of the invention, which is as defined in the appended claims.

What is claimed is:

1. A system for automated text anonymisation of documents, the system comprising:
    at least two symbolic artificial intelligence (AI) pipeline components including named-entity recognition (NER) processes that detect personal information in at least a first document of the documents, at least one of the symbolic artificial intelligence (AI) pipeline components generating at least one label that indicates a type of the personal information and indicates a position of the at least one label in the first document;
    a masking component receiving the at least one label and applying a mask to the first document based on the position of the at least one label with the first document, the masking component generating a de-identified first document; and
    a zoning component, connected to at least one of the symbolic artificial intelligence (AI) pipeline components or the masking component, that executes a trained machine learning model to identify key areas of the first document,
    wherein:
        the symbolic AI pipeline components comprise a time-shift component that receives a first date or time being a second text item of the personal information from at least the first document and generates a second date or time by adding or subtracting a predetermined time period from the first date or time, and
        the second date or time is included in the at least one label.

2. The system according to claim 1, further comprising:
    an AI pipeline module instantiating the symbolic AI pipeline components and the machine learning model of the zoning component.

3. The system according to claim 1, further comprising:
    a redacter receiving the at least one label and replacing text in the position of the at least one label to the first document based on the position of the at least one label with the first document.

4. The system according to claim 1, wherein the symbolic AI pipeline components comprise a newline segmenter configured to split or join sentences in the first document according to a predetermined sentence segmentation logic.

5. The system according to claim 1, wherein the symbolic AI pipeline components comprise a person title NER component of the NER processes that includes symbolic AI rules that identify person titles in text of the first document and outputs a title label.

6. The system according to claim 1, wherein the symbolic AI pipeline components comprise:
    a person label NER component of the NER processes that includes symbolic AI rules that identify person labels in text of the first document and outputs an honorific label; or
    a person name NER component of the NER processes that includes symbolic AI rules that identify person names in text of the first document and outputs a name label.

7. The system according to claim 1, wherein the symbolic AI pipeline components comprise:
    a hashing component that generates a hash code representation of a first text item of the personal information, the hash code representation being included in the at least one label,
    wherein the hashing component applies a N-gram hash to generate the hash code representation.

8. The system according to claim 1, wherein the symbolic AI pipeline components are applied to a training set or as a training set for a neural network AI model or a machine learning AI model to bootstrap a learning of the neural network AI model or the machine learning AI model, the learning comprising representing a symbolic AI logic of the symbolic AI pipeline components as machine learning or neural network layer connections.

9. The system according to claim 1, wherein the symbolic AI pipeline components comprise computer readable instructions stored on computer readable media that, when executed by a hardware processor of a computer, cause the computer to perform one or more processes including detecting the personal information.

10. A method for automated text anonymisation of documents, the method comprising:
   processing at least one first document of the documents by applying symbolic artificial intelligence (AI) pipeline components including named-entity recognition (NER) processes that detect personal information in the at least one first document;
   processing the at least one first document by applying a zoning component, connected to at least one of the symbolic artificial intelligence (AI) pipeline components or a masking component, that executes a trained machine learning model to identify key areas of the first document;
   outputting the personal information or the key areas individually as at least one label to a label file associated with the at least one first document, each of the at least one label including a type of the personal information or key area and a position of the personal information or key area in the at least one first document; and
   generating, via the masking component, at least one first de-identified document based on the label file and the at least one first document, the at least one first de-identified document having a mask at a mask position corresponding to the position of personal information in each of the at least one label in the at least one first document,
   wherein the method further comprises:
      receiving at a time-shift component of the symbolic AI pipeline components a first date or time being a second text item of the personal information from the at least one first document;
      generating a second date or time by adding or subtracting a predetermined time period from the first date or time; and
      incorporating the second date or time into a second label of the at least one label corresponding to the second text item of the personal information.

11. The method according to claim 10, further comprising:
   instantiating, via an AI pipeline module, the symbolic AI pipeline components and the machine learning model of the zoning component.

12. The method according to claim 10, wherein the symbolic AI pipeline components comprise a newline segmenter configured to split or join sentences in the first document according to a predetermined sentence segmentation logic, the newline segmenter processing the at least one first document before the NER processes.

13. The method according to claim 10, wherein the symbolic AI pipeline components comprise:
   a person title NER component of the NER processes that includes symbolic AI rules that identify person titles in text of the first document and outputs a title label;
   a person label NER component of the NER processes that includes symbolic AI rules that identify person labels in text of the first document and outputs an honorific label; or
   a person name NER component of the NER processes that includes symbolic AI rules that identify person names in text of the first document and outputs a name label.

14. The method according to claim 10, further comprising:
   generating, via a hashing component, a hash code representation of a first text item of the personal information; and
incorporating the hash code representation into a first label of the at feast one label corresponding to the first text item of the personal information,
   wherein the hashing component applies a N-gram hash to generate the hash code representation.

15. The method according to claim 14, wherein the hash code representation is applied by the masking component as the mask to the at least one first document in the position of the personal information corresponding to the first text item.

16. The method according to claim 10, wherein the mask applied by the masking component to the at least one first document is a character-for-character replacement of characters forming the personal information.

17. The method of claim 10, further comprising:
   accelerating a learning of a neural network AI model or a machine learning AI model by applying the symbolic AI pipeline components are applied to a training set or as a training set for the neural network AI model or the machine learning AI model, the learning comprising representing a symbolic AI logic of the symbolic AI pipeline components as machine learning or neural network layer connections.

18. A non-transitory computer-readable medium storing computer instructions that when executed on a processor of a computer cause the processor to perform the method of claim 10 on the documents received at the computer.

* * * * *

UNITED STATES PATENT AND TRADEMARK OFFICE
CERTIFICATE OF CORRECTION

PATENT NO. : 11,893,135 B2
APPLICATION NO. : 17/180233
DATED : February 6, 2024
INVENTOR(S) : Benjamin Clayton Hachey It is certified that error appears in the above-identified patent and that said Letters Patent is hereby corrected as shown below:

On the Title Page

At item (54), and in the Specification, Column 1, Lines 1-2, "METHOD AND SYSTEM FOR AUTOMATED TEXT" should be --METHOD AND SYSTEM FOR AUTOMATED TEXT ANONYMISATION--

Signed and Sealed this
Seventh Day of May, 2024

Katherine Kelly Vidal
Director of the United States Patent and Trademark Office